G. S. & G. R. BAKER.
MOLDING OR SHAPING DOUGH.
APPLICATION FILED JUNE 20, 1913.

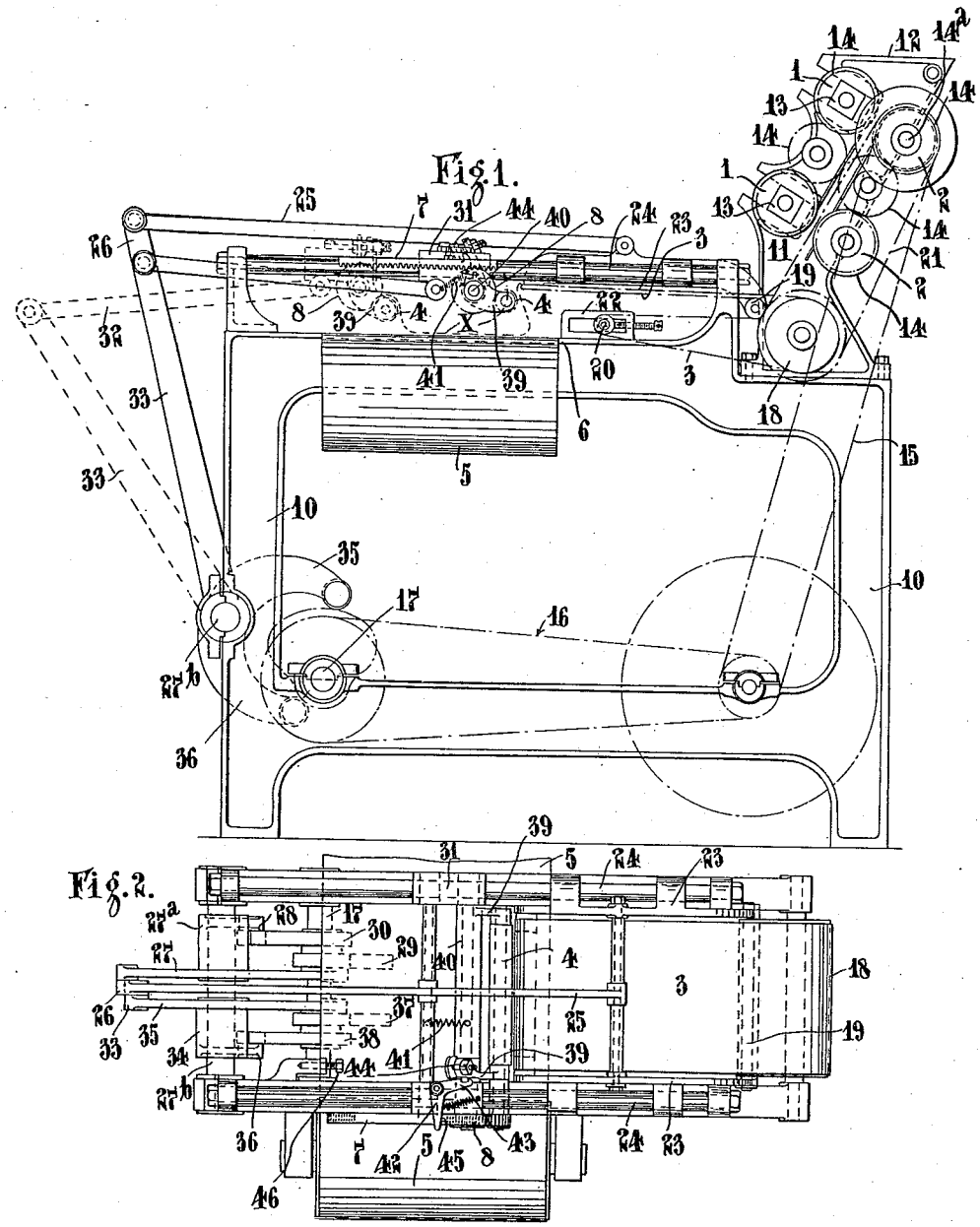

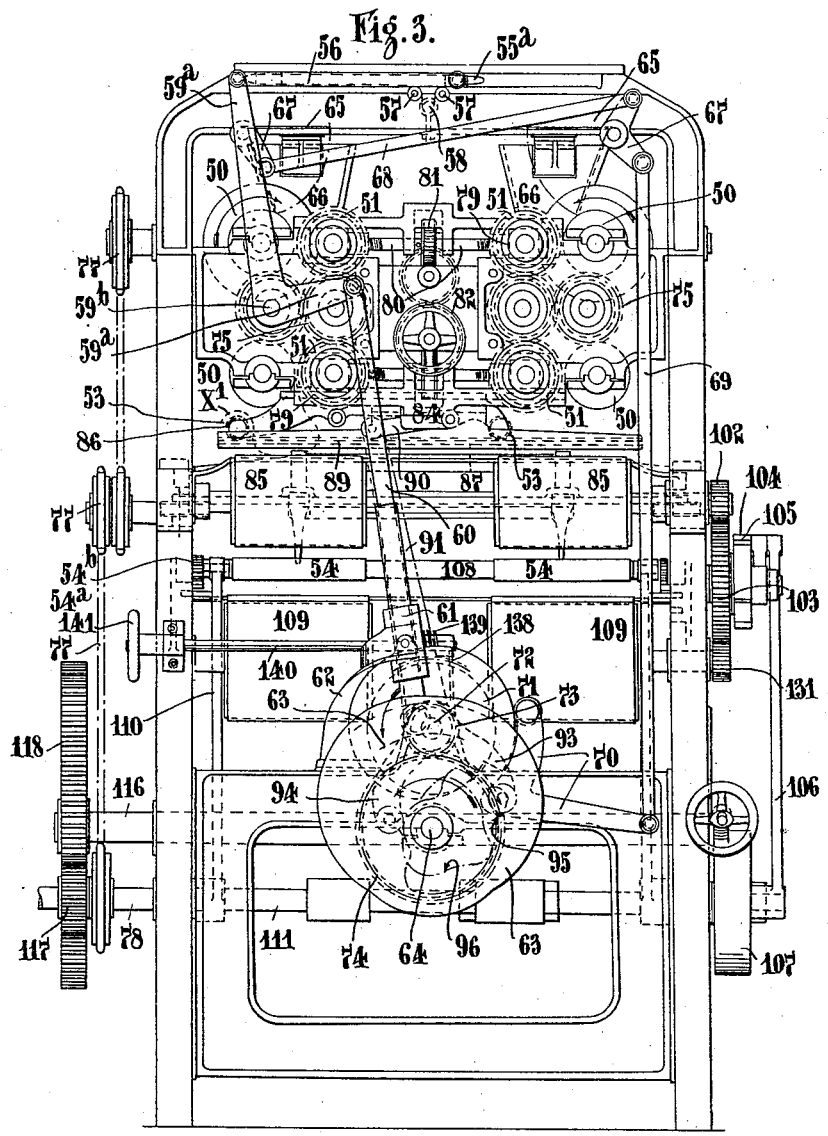

1,109,895.

Patented Sept. 8, 1914.
4 SHEETS—SHEET 3.

Fig. 4.

Witnesses
C. A. Walter
L. G. Anger

Inventors
George Samuel Baker
George Ralph Baker
by R. Hadden
Attorney

G. S. & G. R. BAKER.
MOLDING OR SHAPING DOUGH.
APPLICATION FILED JUNE 20, 1913.

1,109,895.

Patented Sept. 8, 1914.
4 SHEETS—SHEET 4.

Witnesses
C. A. Walter.
L. G. Anger.

Inventors
George Samuel Baker
George Ralph Baker
by Haddan
Attorney

UNITED STATES PATENT OFFICE.

GEORGE SAMUEL BAKER AND GEORGE RALPH BAKER, OF LONDON, ENGLAND.

MOLDING OR SHAPING DOUGH.

1,109,895.  Specification of Letters Patent.  Patented Sept. 8, 1914.

Application filed June 20, 1913. Serial No. 774,830.

*To all whom it may concern:*

Be it known that we, GEORGE SAMUEL BAKER and GEORGE RALPH BAKER, subjects of the King of England, residing at London, in England, have invented certain new and useful Improvements in Apparatus for Molding or Shaping Dough, of which the following is a specification.

This invention relates to a novel method and means for the molding or shaping of dough, and is more particularly adapted to effect the doubling or folding operations required in the production of Scotch or square loaves and the like.

Broadly stated the invention consists in producing a series of doubling and folding operations by a sequence of movements including the engagement of the initial or forward portion of a dough sheet by a doubling or folding member such as a roller, the depositing of an intermediate portion of said sheet by gravity onto a support, the feed or deposit of the final portion of the sheet onto the previously mentioned intermediate portion and the subsequent folding of the initial portion onto the final portion, these operations being if required increased to produce any desired number of intermediate portions or folds.

The invention further consists in subjecting the dough after the doubling operations referred to, to the action of one or more rollers or pairs thereof for the purpose of welding, squeezing or compacting the folds prior to a subsequent folding or doubling operation.

Embodiments of the invention are represented in the accompanying drawings, in which—

Figure 5:
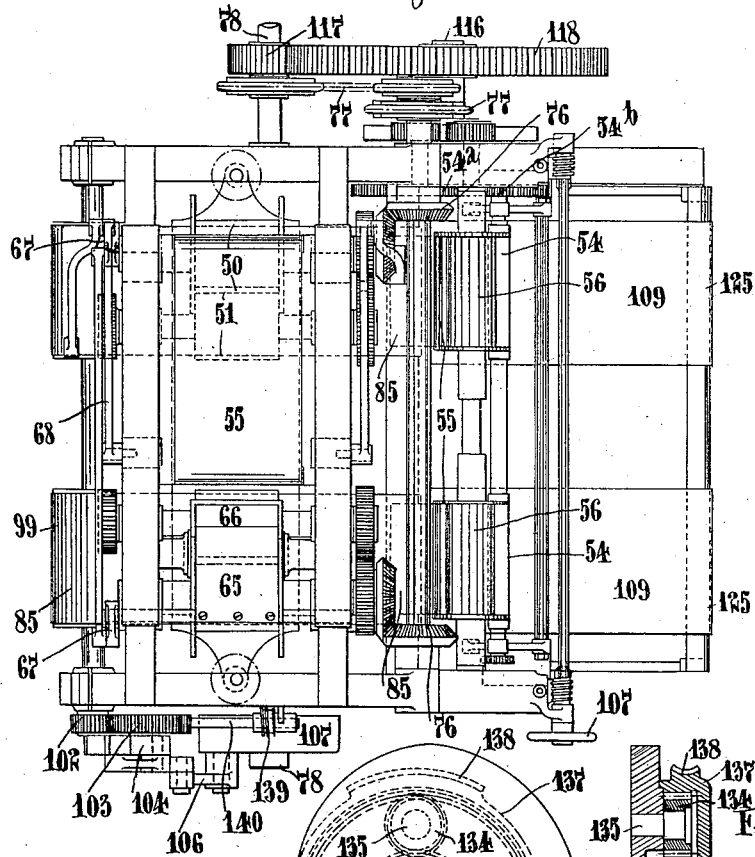
Figure 6:
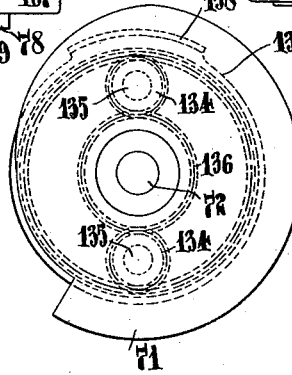
Figure 7:
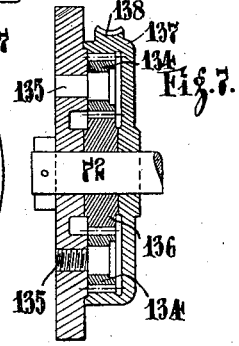

Figure 1 is a side elevation of one form of machine suitable for carrying out the improved method, and Fig. 2 a plan view thereof with parts removed. Fig. 3 is a side elevation of a second form of machine. Fig. 4 is an end view of the machine shown in Fig. 3. Fig. 5 is a plan view of Fig. 4, and Figs. 6 and 7 are detail views of parts shown in Figs. 3 to 5.

Referring to Figs. 1 and 2, to effect the initial doubling operations a lump of dough of determined dimensions previously dealt with if desired in measuring and proving apparatus is fed between pairs of rolls 1, 2 to sheet or gage same, and is passed from said rolls onto a web or conveyer 3 which is given continuous forward motion and in addition the forward part is given an advancing and receding motion. Adjacent the forward end of said web is located a roller 4 capable of rising and falling and reciprocating movements, and the forward end of the sheet of dough is fed from the web onto said roller whereupon the roller is caused to recede for a determined distance, this movement combined with the continuous motion of the web causing a bight or intermediate portion of the sheet of dough $x$ to be dropped by gravity between the roller and the end of the web, as shown in broken lines in Fig. 1, this portion being supported as by a web 5 supported on the table 6 of the machine or by other appropriate means. This web 5 is shown as extending at right angles to the web 3. The forward end of the web 3 is then caused to advance toward the roller, this causing another or final part of the dough sheet fed forward by the web 3 to be laid on that already deposited on the web 5, the other end still remaining on the aforesaid roller 4. The web 3 may now again recede and the roller is given an advancing movement in the same direction, and is at the same time rotated as by means of rack 7 and pinion 8. This action causes the initial portion of dough on said roller to be rolled off same and deposited upon the second thickness or final portion of dough previously deposited by the web, and at the same time presses the folds made in the piece of dough together, thus producing a lump of dough formed of three folds or thicknesses. At the end of this stroke the roller is raised to the position shown at the right in Fig. 1, thus passing clear of the lump of dough on the return stroke and allowing said dough to be moved away on the web 5. The folding may also be performed by returning the folding roller 4 to the left hand (Fig. 1) end of the stroke before laying the dough sheet over it, and carrying the dough on the web 3 forward to deposit the forward end over the roller, the intermediate portion of dough is laid on the support by causing the forward end of the web to recede (the folding roller remaining stationary) and the web is caused to advance again to deposit the final part of the dough sheet onto the intermediate portion, the web then once more recedes, and the folding roller comes forward, completing the fold and compacting the whole lump. The lump of dough may be now pressed out between rolls or otherwise and again dealt with as above described in a direction at right angles to that previously performed. To now more specifically describe the mechanism by which the above operations are performed, 10 designates the main frame of the machine on which there is mounted at one end a bracket 11 provided at its upper end with a hopper or chute 12 into which the lump of dough is fed to the gaging rollers 1, 2 previously mentioned. Two pairs of such rollers are shown, one of each pair being mounted in sliding bearings 13 for adjusting the distance between each pair and the rollers being geared together by toothed wheels 14, the shaft 14$^a$ of one of which is driven by chains 15 and 16 from the main driving shaft 17 of the machine. The web 3 above mentioned passes about rollers 18, 19 and 20, the former of which is driven by a chain 21 from the shaft 14$^a$ and the latter of which is shown as mounted in adjustable bearings 22. The web also passes about one end of a slide 23 carrying the roller 19 and mounted to reciprocate on guide rods 24 at each side of the machine, the desired movements being imparted to said slide by means of a rod 25 actuated by a lever 26 provided with a pair of arms 27, 28 mounted on a sleeve 27$^a$ on a shaft 27$^b$, each of which arms is operated by a cam 29, 30 respectively on the main shaft 17 to positively move said lever in opposite directions. The roller 4 above referred to is mounted on a second slide 31, also adapted to be reciprocated on the guide rods 24 by means of a rod 32 actuated by a lever 33 having two arms 35 and 36 mounted on a sleeve 34 on shaft 27$^b$, which arms are actuated by cams 37 and 38 respectively on shaft 17 to positively drive the lever in both directions. The roller 4 is itself carried by levers 39 one at each side of the machine pivoted at 40 upon the slide and is geared to the stationary rack 7 by means of the pinion 8. The lever 39 is under the action of a spring 41 which normally holds the roller in raised position as shown in the right hand position of Fig. 1. To hold the roller depressed, that is to say, in the left hand position of Fig. 1, there is pivoted on the slide 31 a spring operated catch 42 having a notched arm 43 adapted to normally engage a pin or stud 44 on one of the levers 39. On movement of the slide 31 to the right the catch engages a pin 45 on the rack 7 and releases the catch from the stud 44, thus allowing the spring 41 to raise the roller, and on movement of the slide in the opposite direction the stud 44 engages an adjustable abutment 46 on the machine frame which causes the levers 39 to rock about their pivot and the stud 44 to be again engaged by the notched arm 43 of the catch.

Another construction of machine is illustrated in Figs. 3 to 5, which show a double or duplex machine for treating two lumps of dough at once. In the general function of such a machine to produce the doubling movements a lump of dough is fed for example downward between pairs of feed or gaging rolls 50, 51, and below or adjacent said rolls there is disposed to one side of the path of the sheet of dough and at a determined distance above the table of the machine a folding or doubling roller 53 capable of horizontal movement or movement in a plane at right angles to the course of the sheet of dough issuing from the feed rolls. When the dough sheet has been fed for a given distance, the folding roller, which is capable of rotation in one direction but is restrained from rotation in the other direction as by means of a free-wheel clutch or the like, is advanced in a horizontal direction without rotation to engage one side of the forward end of the dough sheet, continued movement in the same direction causing a portion of the sheet to hang over the roller and another or intermediate portion to rest upon a table, conveyer or web 85 disposed below the roller 53. The rolls 50, 51 still feeding the sheet will cause that part on the web 85 to assume a fold or become doubled and the end or final part of the sheet will be deposited upon that portion on the web and produce the second thickness. The folding roller 53 still carrying the forward end of the dough sheet is now reversed or caused to recede, rotation of said roller now taking place and these movements will cause said forward end to be folded or doubled back over the aforesaid second thickness or final part of the sheet to produce the third thickness, the roller automatically rolling over the upper surface of the whole. The lump of dough thus produced is preferably again treated in a similar manner in a direction at right angles to the first operations as previously explained, by means of a further folding roller 54 being first however subjected to a squeezing or welding action by means of a pair of rollers 55, 56, Fig. 4.

In both the methods of initial folding or doubling above mentioned the size of the lump of dough, the gaging or sheeting thereof and the movements of the conveyer or feed rolls and folding roller must be so calculated that the folds of the molded articles are of the correct proportions, and means are hereinafter described for this purpose.

To now specificaly describe the mechanism by which the above mentioned operations are performed, as aforesaid, the machine of Figs. 3 to 5 is adaptetd to deal with two lumps of dough simultaneously but the description of one set of mechanism will suffice for both in so far as the self contained functions thereof are concerned.

At the top of the machine is a web 55ª on which the lumps of dough are placed, this web passing about knife edges at the ends of a slide 56 and about fixed rollers 57 attached to a bar 58 capable of adjustment for tightening the web by means of adjusting screws 58ª. The slide is carried by arms 59 and is reciprocated across the machine by means of a crank 59ª pivoted at 59ᵇ actuated by a rod 60 guided by a sliding bearing 61 carried by an arm 62 to compensate for arc movements of the lower arm of the bell crank, the said rod 60 being operated by a cam 63 on the cam shaft 64 of the machine, part of the contour only of said cam being shown in Fig. 3 for clearness of illustration. Reciprocation of the slide 56 across the machine will cause the web 55ª to discharge lumps of dough fed onto it at the center of the machine (about which point the slide reciprocates) first onto one end and then onto the other of two flaps 65, each disposed above a chute 66. Said flaps are depressed at the desired moment, being for this purpose pivoted or hinged and each connected to a lever 67 interconnected by a rod 68 and one of which is actuated by a rod 69, bell crank 70 and cam 71 on a shaft 72 driven by gearing 73, 74 from the cam shaft 64. The lump of dough is discharged from the flap 65 into the chute 66 and passes thence between the gaging rolls 50, 51, which are geared together by toothed wheels 75 and one of which is driven by bevel gearing 76 and chain and sprocket mechanism 77 from the main driving shaft 78 of the machine. The rolls 51 are mounted in sliding bearings 79 for varying the distance between each pair according to the amount of gaging of the dough required, and are adjustable by means of screws 80 actuated through worm gearing 81 from a hand wheel 82. The sheeted or gaged dough X¹ issuing from the lowermost pair of rolls 50, 51 is engaged by a roller 53 carried by a reciprocating slide 84 and carried by said roller to the left (Fig. 3), thus causing a part of the dough still issuing from the rolls to sag onto the web 85 disposed in a direction at right angles to the slide, and a subsequent or final portion of said dough to lay itself on that portion already on the web, whereupon the slide and consequently the roller returns to the right and lays that portion of the dough remaining thereon over the final portion on the web, thus making a three-fold lump. The roller 53 is connected to a pinion 86 which engages a rack 87 carried by a cross frame 89 and also has a "free-wheel" clutch or equivalent by which in its movement toward the left no rotation of the roller takes place but in its reverse movement it is rotated by the rack and pinion, consequently unwinding the first portion of dough therefrom and laying it over the final portion issued from the gaging rolls at the same time rolling over said first portion and tending to compact the whole. The slide 84 is reciprocated across the machine at the required times for which purpose it is connected by a link 90 to a lever 91 pivoted on the shaft 72 and provided with a pair of arms 93, 94, each of which is positively actuated by a cam 95, 96 respectively on the cam shaft 64. The dough folding operations above described have taken place on the web 85, while the latter has remained stationary, this web passing over a table 97 capable of vertical adjustment by means of gearing operated by a hand wheel 98 (Fig. 4). The web also passes about a driving roller 99 at one end and at the opposite end about a knife edge 100 fixed to the frame and further over a tensioning roller 101 and is given the desired intermittent movements by the roller 99 being geared as by pinion 102 and spur wheel 103 to pawl and ratchet mechanism 104, 105, the pawl of which is actuated by a rod 106 driven by a crank disk 107 on the main driving shaft. The lump of dough treated as described is fed by the web 85 between the pair of welding or squeezing rolls 55, 56, the latter of which is mounted in sliding bearings 106 adjustable in guides 106ª to vary the distance between said rolls by means of gearing actuated by the hand wheel 107. The rolls are geared together and roller 55 is driven by part of the same chain and sprocket mechanism 77 which drives the rolls 50, 51. The dough passing between the rolls 55, 56 is now engaged by the second folding or doubling roller 54, but obviously in a direction at right angles to previously, this second roller 54 being mounted on a slide 108 working over a web 109. The roller 54 coacts with a rack 54ª and pinion 54ᵇ and also has a "free-wheel" clutch as described with reference to roller 53 and performs exactly similar functions so that no further description thereof is deemed necessary. It is sufficient to point out that the slide 108 is operated by a lever 110 pivoted at 111 and having two arms 112 and 113 operated positively by cams 114 and 115 respectively on a shaft 116 driven by gearing 117, 118 from the main driving shaft. The web 109 passes over a table 119 capable of vertical adjustment as by worm gearing 120 actuated from a hand-wheel 121 and also passes about a driving roller 122, a tensioning roller 123, a guide roller 124 and a knife edge 125, the roller 124 and edge 125 being carried on a reciprocating slide 126 adapted to be actuated by a link 127, lever 128, pivoted at 111 and having an arm 129 which is operated in one direction by a cam 130 on the shaft 116, the lever being operated in the other direction by a cam 138ª also on said shaft. The web 109 is intermittently driven by the aforesaid pawl and ratchet mechanism 104, 105 for which purpose the driving roller 122 is geared by pinion 131 to the spur wheel 103.

The object of mounting the web 109 partially on the slide 126 is to provide means to discharge the lump of dough after the second doubling or folding operations at different points nearer to or farther away from the right hand end of the machine which may be necessary for further operations connected with the dough, this being effected by reciprocating said slide and thereby causing that part of the web passing over the knife edge 125 to advance or recede according to requirements. This construction may however be dispensed with in cases where the point of discharge is constant, in which case the web 109 may be mounted in a similar manner to web 85 above referred to.

To effect the timing of certain of the parts of the mechanism to secure proper proportion of folds and correct feeding and other movements, we have provided certain of the cams, for example the flap operating cam 71 and the pawl and ratchet feed operating disk 107, with a novel form of speed reducing and adjusting mechanism which is shown in detail in Figs. 6 and 7. Taking cam 71 as an example, said cam is mounted loosely on its shaft 72 and supports at diametrically opposite points of its axis planet wheels 134 revoluble on studs 135 and meshing with a pinion 136 fast on the shaft 72. Said planet wheels also mesh with interior teeth on a casing 137 also loose on the shaft, the exterior of said casing having teeth 138 with which engage a worm 139 on a shaft 140 operated by a hand-wheel 141. The normal drive is through the shaft 72, pinion 136 and planet wheels 135 to the cam 71, but when it is desired to change the action of the latter the casing 137 is rotated by the hand-wheel and worm gearing, thus causing through the planet wheels and pinion an angular displacement of the cam with relation to the shaft and effecting the result desired. The cam shaft 64 is driven from the cam shaft 116 by bevel gearing 142.

We do not limit ourselves to the particular mechanism hereinbefore described and illustrated since the same may be varied within limits determined by the appended claims without departing from the spirit of the invention.

What we claim as our invention and desire to secure by Letters Patent of the United States is:

1. In a machine for molding and shaping dough, the combination of a reciprocatory folding member adapted to engage the initial portion of a sheet of dough and move same in a horizontal plane, a support in a lower plane than said folding member onto which the remainder of the dough is deposited by gravity with its final portion in the form of a fold, and means for returning said folding member to deposit said initial portion over said remainder in the form of a second fold.

2. In a machine for molding and shaping dough, the combination of means for feeding a sheet of dough, a folding member adapted to receive the initial portion of the sheet from said feeding means, means for moving said folding member away from said feeding means whereby the remainder of said sheet is deposited by gravity, the feeding means depositing the final portion of the sheet in the form of a fold, and means for returning the folding member to deposit said initial portion over said remainder and compress the whole.

3. In a machine for molding and shaping dough, the combination of means for gaging and sheeting a mass of dough, a reciprocating folding member adapted to receive the initial portion of a sheet of dough from said gaging and sheeting means, and a support onto which the remainder of the dough is deposited from said gaging and sheeting means by gravity in a fold, the folding member being adapted to deposit the initial portion of the dough on said remainder in a second fold.

4. In a machine for molding and shaping dough, the combination of a gaging and sheeting device, a reciprocating folding member adapted to engage and receive a portion of the dough from said gaging and sheeting device and remove it therefrom, a support movable transversely to the movement of said folding member, and means receiving the remainder of the dough in a fold, there being a second fold laid thereon by the return movement of the folding member, and means for actuating said movable support to discharge the dough.

5. In a machine for molding and shaping dough, the combination of gaging means, a feeding element adapted to deliver the dough to said gaging means, a folding member adapted to engage the initial portion of the dough from said gaging means and move same away therefrom in a horizontal plane, a support in a lower plane than said folding member on which the remainder of the dough is deposited by gravity from the gaging means in the form of a fold, means for causing the folding member to return and deposit the initial portion of the dough on the remainder in a second fold, and means for operating said feeding element in timed relation with said folding member.

6. In a machine for molding and shaping dough, the combination of a folding roller adapted to engage the initial portion of a sheet of dough, a reciprocating slide carrying said roller, a support in a lower plane than said folding roller on which the remainder of the dough is deposited by gravity in the form of a fold, and means for actuating said slide and roller whereby the latter is caused to deposit the initial portion of the dough on said remainder in a second fold and compress the whole.

7. In a machine for molding and shaping dough, the combination of means for feeding a sheet of dough, a folding roller receiving the initial portion of the dough from said feeding means, a reciprocating slide carrying said roller, means for axially rotating said roller in one direction of slide travel, and for preventing such rotation in the other direction of such travel, a support on which the remainder of the dough is deposited by the feeding means in a fold, and means for actuating said slide and roller whereby the latter is caused to deposit the initial portion of the dough on said remainder in a second fold.

8. In a machine for molding and shaping dough, the combination of means for feeding a sheet of dough, a folding roller receiving the initial portion of the dough from said feeding means, a reciprocating slide carrying said roller, means for axially rotating said roller in one direction of slide travel, and for preventing such rotation in the other direction of such travel, a support movable transversely to the movement of said folding member on which the remainder of the dough is deposited by the feeding means in a fold, means for actuating said slide and roller whereby the latter is caused to deposit the initial portion of the dough on said remainder in a second fold, and means for actuating said movable support to discharge the dough.

9. In a machine for molding and shaping dough, the combination of an element for feeding a mass of dough, means receiving said mass from the feeding element and adapted to convert same into a sheet of predetermined thickness, a folding roller adapted to engage the initial portion of the sheet delivered from said sheeting means, and carry same in a horizontal direction, a reciprocating slide carrying said roller, means for axially rotating said roller in one direction of slide travel, and for preventing such rotation in the other direction of slide travel, a support in a lower plane than said folding roller onto which the remainder of the dough is deposited by the sheeting means in a fold, means for actuating said slide and roller whereby the latter is caused to deposit the initial portion of the dough on said remainder in a second fold, means for operating the aforesaid feeding element in timed relation with said folding member, and means for varying the timed relation of said feeding member and folding member to control the action of the latter on the sheet of dough.

10. In a machine for molding and shaping dough, the combination of an element for feeding separated lumps of dough, gaging and sheeting means receiving at intervals lumps of dough from said feeding means, a folding member adapted to engage the initial portion of the sheeted dough and move same away therefrom in a horizontal plane, a support in a lower plane than said folding member on which the remainder of the dough is deposited by gravity in the form of a fold, the folding member being then adapted to return and deposit the initial portion of the dough on the remainder in a second fold, means for operating said feeding element in timed relation with said folding member, and means for varying the timed relation of said last mentioned element and member, whereby the action of the latter on the sheeted dough may be controlled.

In witness whereof we have signed this specification in the presence of two witnesses.

GEORGE SAMUEL BAKER.
GEORGE RALPH BAKER.

Witnesses:
HERBERT D. JAMESON,
O. J. WORTH.

Copies of this patent may be obtained for five cents each, by addressing the "Commissioner of Patents, Washington, D. C."